(12) United States Patent
Chen

(10) Patent No.: US 9,269,048 B1
(45) Date of Patent: Feb. 23, 2016

(54) DISTRIBUTION SHARED CONTENT BASED ON A PROBABILITY

(71) Applicant: Google Inc., Mountain View, CA (US)

(72) Inventor: Kai Chen, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/804,744

(22) Filed: Mar. 14, 2013

(51) Int. Cl.
*G06N 5/04* (2006.01)
*G06N 99/00* (2010.01)

(52) U.S. Cl.
CPC .............. *G06N 5/048* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 2010/0049584 A1* | 2/2010 | Mehta et al. | 705/10 |
| 2011/0040616 A1* | 2/2011 | Kannan et al. | 705/14.45 |
| 2013/0174045 A1* | 7/2013 | Sarukkai et al. | 715/744 |
| 2014/0244354 A1* | 8/2014 | Seifert | 705/7.31 |

OTHER PUBLICATIONS

Radlinski et al, Optimizing Relevance and Revenue in Ad Search: A Query Substitution Approach, 2008.*

* cited by examiner

*Primary Examiner* — Jeffrey A Gaffin
*Assistant Examiner* — Mikayla Chubb
(74) *Attorney, Agent, or Firm* — Lowenstein Sandler LLP

(57) ABSTRACT

A system and method for distributing shared content based on a probability is provided. The system includes a shared content request unit to receive a shared content request; a bid retrieval unit to retrieve a plurality of shared content items based on the share content request, and to retrieve a plurality of bids corresponding to the plurality of shared content items, respectively; a probability retrieval unit to retrieve a plurality of likelihood values for each of the plurality of bids, respectively; a bid adjustment unit to adjust the plurality of bids based on the corresponding plurality of likelihood values; and a shared content selection unit to select shared content based on the adjusted plurality of bids.

15 Claims, 4 Drawing Sheets

```
        410
401           411   412   413
    Shared Content  2.0   0.1   0.7
    Shared Content  2.0   0.09  0.9
402
```

FIG. 4A

```
        420
401           421   422   423   424
    Shared Content  0.2   0.27  0.34  0.48
    Shared Content  0.18  0.261 0.342 0.504
402
```

FIG. 4B

```
    430
           432  401              433
     401
431     Winner            Second Price
K=0     Shared Content    0.18/0.1 = 1.8
K=0.5   Shared Content    0.261/(0.1 * ( 1 + 0.5 * 0.7)) = 1.93
K=1     Shared Content    0.34/(0.09 * (1 + 1.0 * 0.9)) = 1.99
K=2     Shared Content    0.48/(0.09 * (1 + 2.0 * 0.9)) = 1.90
                     402
   402
```

FIG. 4C

DISTRIBUTION SHARED CONTENT BASED ON A PROBABILITY

BACKGROUND

Various content sources and web sites incorporate an auction process for determining shared content to distribute along with the content. Shared content may be directed towards goods or services, and include information about the goods or services and/or meta data associated with the goods or services. The meta data may include a link to an external web site, serving additional information about the goods or services.

The shared content may be incorporated instream along with the content being served. Thus, if a user accesses the content, the shared content may be presented before or during the presentation of the content.

The auction process for shared content distribution employs a bidding process. Thus, various parties that are associated with the shared content may bid for certain search queries/keywords associated with the content source. For example, if a visitor to the content source searches for dog videos, the auction process may serve shared content at a rate contingent on a bid submitted by each shared content provider.

The content source may desire to maximize revenue. Thus, in choosing shared content to serve alongside content already being served, the content source may select the highest bid recorded during the auction process.

SUMMARY

A system and method for distributing shared content based on a probability is provided. The system includes a shared content request unit to receive a shared content request; a bid retrieval unit to retrieve a plurality of shared content items based on the share content request, and to retrieve a plurality of bids corresponding to the plurality of shared content items, respectively; a probability retrieval unit to retrieve a plurality of likelihood values for each of the plurality of bids, respectively; a bid adjustment unit to adjust the plurality of bids based on the corresponding plurality of likelihood values; and a shared content selection unit to select shared content based on the adjusted plurality of bids.

DESCRIPTION OF THE DRAWINGS

The detailed description refers to the following drawings, in which like numerals refer to like items, and in which:

FIGS. 4(a)-(c) illustrates examples of tables populated by the system described in FIG. 2.

DETAILED DESCRIPTION

Figure 1:
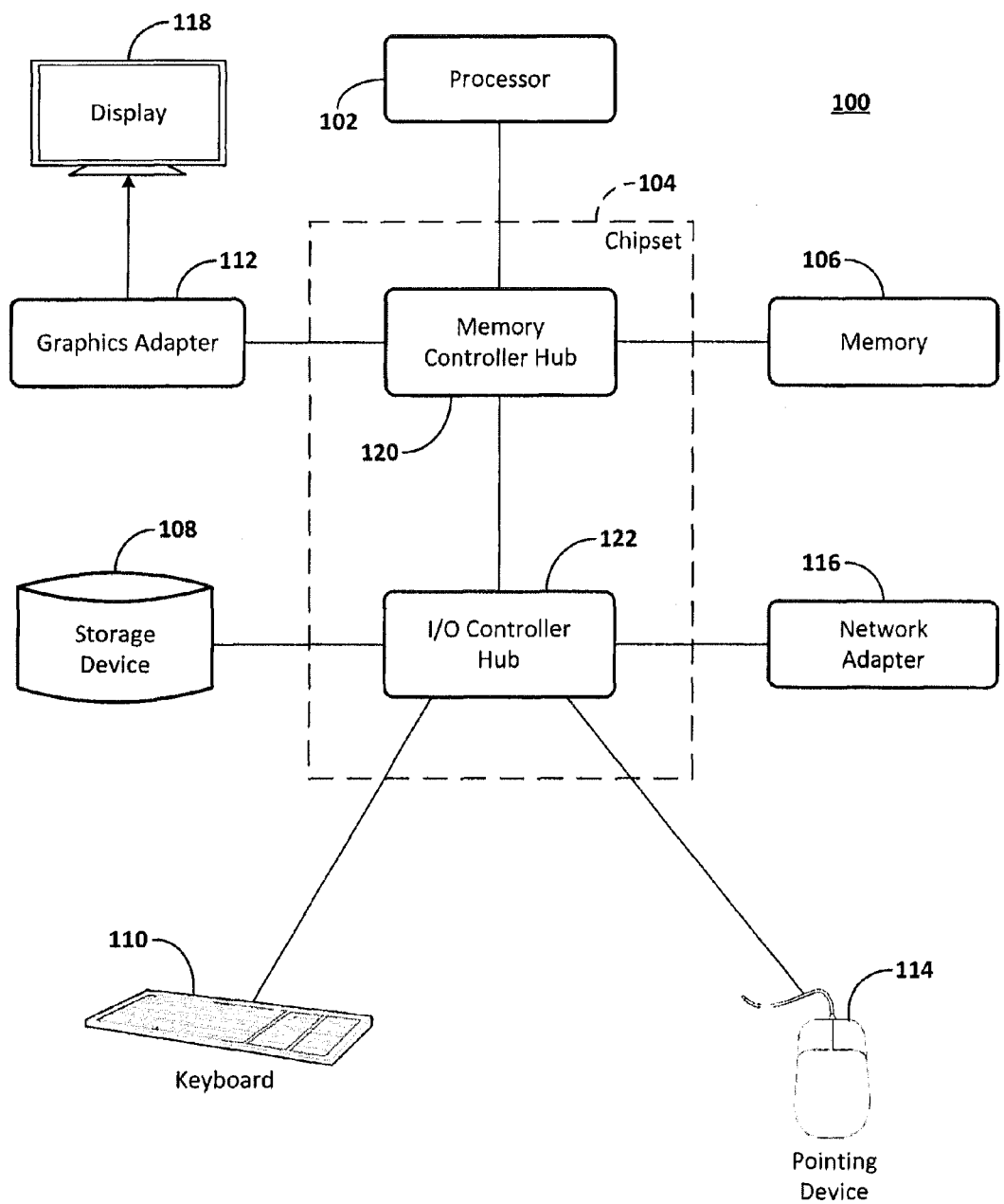
FIG. 1 is a block diagram illustrating an example computer.

A shared content distribution system employing a bidding process is one-dimensional in that it only takes into account the revenue generated from a single viewing of the shared content. Specifically, a publisher associated with the content source may select the shared content associated with the highest bid, and thus, generate revenue associated with that bid.

A potential limitation to the above-described system is that different shared content items may have different abilities associated with maintaining a visitor's interest. For example, certain shared content may be successful at generating more views of additional content. Conversely, shared content not be successful at maintaining the interest of the visitor to the content source, i.e. the shared content may instigate the visitor to abandon access to the content source.

If the visitor abandons access, the publisher of the content loses revenue that may be gained through subsequent accesses to additional content. This is due to the fact that each subsequent access may be affiliated with additional revenue associated with shared content being served. The visitor may abandon access due to the shared content item not being successful at captivating the visitors interest. Certain shared content, such as shared content associated with a major event, may be more successful than other shared content at captivating and encouraging a visitor to maintain a presence on the content source.

Thus, by merely selecting a shared content based on the above-described bidding system, the content publisher prevents a maximization of revenue. While the current serving of content with a selected shared content may lead to the greatest revenue for one view, the long-term revenue generation may be hindered.

The systems and methods disclosed herein are directed to distributing shared content based on a probability that a visitor to a shared content source will subsequently access the content source for additional content. Thereby, revenue associated with shared content distribution is potentially maximized.

In situations in which the systems discussed here collect personal information about users, or may make use of personal information, the users will be provided with an opportunity to control whether programs or features collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user will have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
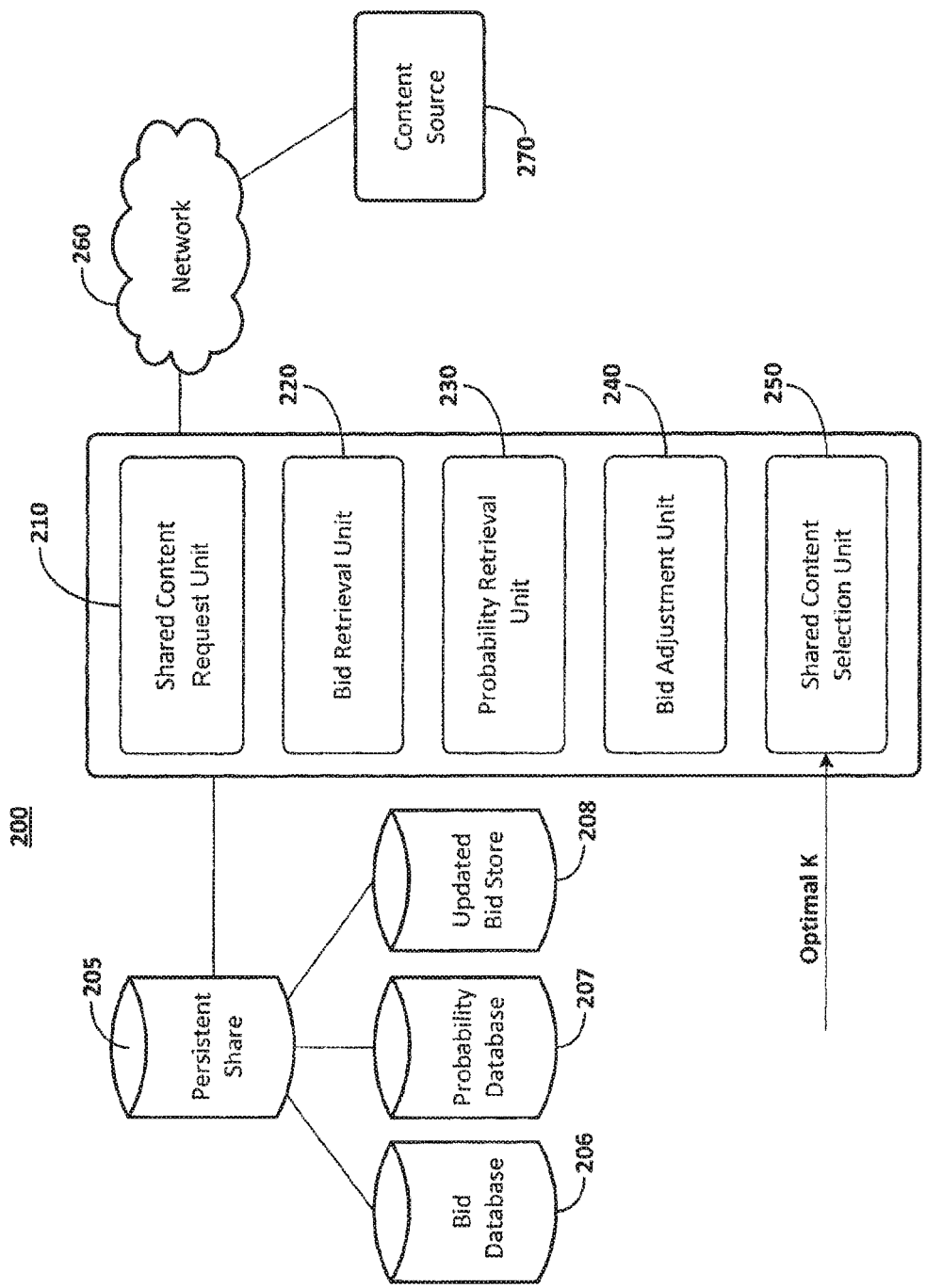
FIG. 2 illustrates an example of a system for distributing shared content based on a probability.

FIG. 2 illustrates a system 200 for distributing shared content based on a probability. The system 200 includes a shared content request unit 210, a bid retrieval unit 220, a probability retrieval unit 230, a bid adjustment unit 240 and a shared content selection unit 250. The system 200 may be implemented on a device, such as computer 100.

The shared content request unit 210 receives a request to select shared content. The request may be sourced from a content source, such as a video sharing web site. The request may be performed as content is being served to a visitor to the content source. Alternatively, the request may be instigated or associated with a search keyword received by the content source. Thus, various shared content providers may bid for popular keywords associated with the content source.

The bid retrieval unit 220, based on the request for shared content, may retrieve bids associated with metrics included in the request from a bid database 206. For example, the bid database may store bids from shared content providers associated with the content presently being served by the content source, or a keyword being employed to search for content in the content source.

Each of the bids retrieved may be adjusted with a click-through rate (CTR). The CTR is a machine learned factor that estimates the probability that the shared content will be clicked through. Thus, each bid's associate cost may be reflected with the following relationship:

$$C\text{-shared content }(sc) = \text{bid} * CTR \quad \text{(Equation 1)}$$

The probability retrieval unit 230 may retrieve, from the probability database 207, the probability that a visitor to the content source will abandon the content (i.e. terminate access) based on a particular shared content item being accessed. This probability may be referred to in this disclosure as P-abandon. Conversely, the probability that the visitor does not abandon the content may be referred to as P-keepwatch (P-keepwatch=1−P-abandon).

Thus, the probability retrieval unit 230 may retrieve, for each of the shared content items retrieved from the bid retrieval unit 220, a P-keepwatch may be retrieved from the probability database 207. The P-keepwatch may be generated by various heuristics and machine language learning techniques. For example, the P-keepwatch may be estimated based on data associated with shared content directed to a similar scope, affiliated with a similar/same web site, or the like.

Additionally, attributes associated with the visitor may be used to determine the P-keepwatch associated with a specific shared content item. For example, it may be determined through machine learning that visitors who are males ages 18-24 are likely to access a specific shared content item with a P-keepwatch of 0.8. Thus, if the system 200 is cognizant that a visitor is a male aged 19, the system 200 may ascertain the P-keepwatch based partially on those known attributes.

The bid adjustment unit 240 may adjust the bid based on the data retrieved by the probability retrieval unit 230. The adjustment may depend on time to reflect that shared content that instigates an abandonment may be more detrimental to overall revenue over time. The following relationship may be used to determine an estimated cost over time:

$$C\text{-}s = C\text{-}sc * (1 + K * P\text{-keepwatch});$$

or $$C\text{-total} = C\text{-}sc * (1 + K * P\text{-keepwatch}) \text{—where } C\text{-total is the total revenue over time} \quad \text{(Equation 2)}$$

K in the above expression represents various time intervals. Thus, the bid adjustment unit 240 may create updated bids for all of the retrieved shared content items in an updated bid database 207.

The shared content selection unit 250 accesses the updated bid database 207, selects an optimal value for K, and retrieves shared content associated with the optimal value for K. An optimal value for K may be ascertained by previous experiments associated with the specific visitor, the specific content being viewed, or other factors relevant to the operation of where the shared content will be served. The selected shared content may be selected based on the adjusted bid that maximizes this relationship:

$$C\text{-}winningbid = \frac{C\text{-}s}{CTR(1 + k*P - keepwatch)} \quad \text{(Equation 3)}$$

Thus, based on the updated bid selection, the system 200 may ensure that the shared content selected leads to the maximization of revenue over a period of time.

The total cost paid by the winner in the above model is based on the second place bid. Thus, by using the concepts of a generalized second-prize auction, the total costs will reflect the bid price made the second place bidder in the above relationship.

Figure 3:
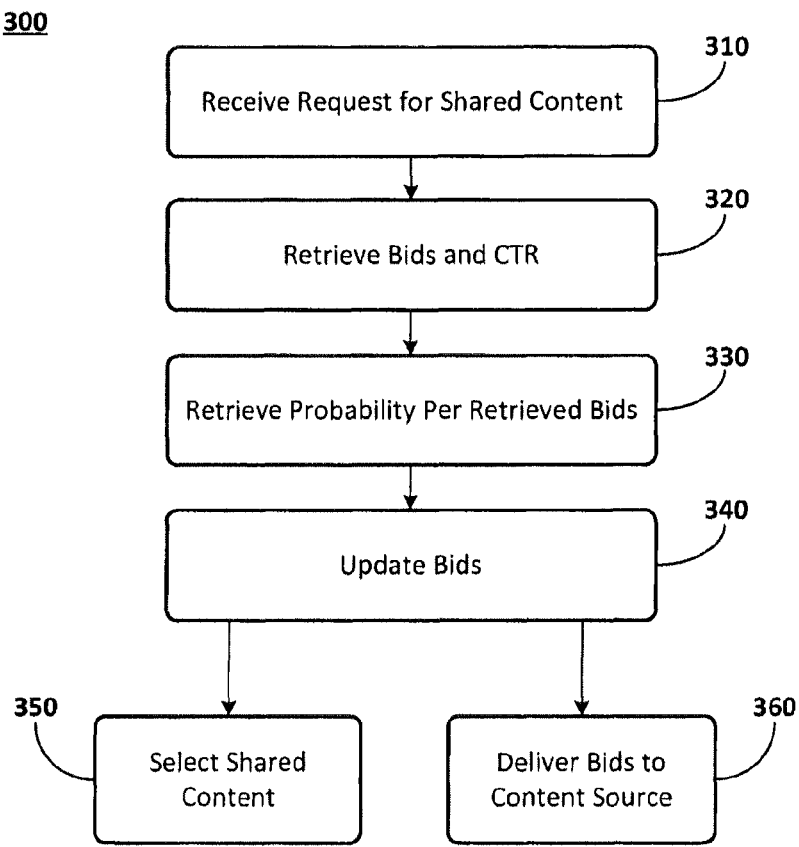
FIG. 3 illustrates an example of a method for distributing shared content based on a probability.

FIG. 3 illustrates an example of a method 300 for distributing shared content based on a probability. The method 300 may be implemented on the system 200.

In operation 310, a request to select shared content is received. The request may be sourced from a content source, such as a video sharing web site. The request may be performed as content is being served to a visitor to the content source. Alternatively, the request may be instigated or associated with a search keyword received by the content source. Thus, various shared content providers may bid for popular keywords associated with the content source.

In operation 320, based on the request for shared content, bids may be retrieved associated with metrics included in the request. For example, bids may be retrieved for shared content associated with the content presently being served by the content source, or a keyword being employed to search for content in the content source.

In operation 330, a probability (P-keepwatch) associated with each of the bids may be retrieved. In operation 340, each of the bids retrieved in operation 320 are adjusted based on the probabilities retrieved in operation 330. The adjustment may employ the same relationship described above in conjunction with the bid adjustment unit 240. Thus, as a culmination of operation 340, a table with adjusted bids may be populated over various times (K).

In operation 350, a shared content is retrieved from the populated table created in operation 340. The shared content may be retrieved based on an optimal K determined through a machine learning process. Alternatively, the optimal K may be selected based on analysis of the visitors cookie file. A cookie file is a history of accesses to a web site in which data and logs are maintained.

Alternatively, if no optimal K is selected or provided, in operation 360, the table of calculated values for various K values may be transmitted to the content source. Thus, the content source may determine an optimal K based on experimental data, and select shared content accordingly.

FIGS. 4(a)-(c) illustrates examples of tables populated by the system 200.

FIG. 4(a) is a table 410 that includes the following fields, bid 411, CTR 412, P-keepwatch 413. The various values are populated with values associated with a shared content item 401 and a shared content item 402.

FIG. 4(b) is a table 420 that includes the following fields, C(k=0) 421, C(k=0.5) 422, C(k=1) 423, C(k=2) 424. The various data entries associated with the table 420 employ equation 2, as described above.

FIG. 4(c) is a table 430 that includes the following fields, K 431, Winner 432, and Second Price 433. The winner 432 field reflects the shared content item, in this case between shared content item 401 and shared content item 402, with the higher Second Price 433 value. The Second Price 433 column is populated for shared content 401 and shared content 402 using equation 3 described above, and the example values included in FIGS. 4(a) and 4(b).

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

I claim:

1. A system, comprising:
a data store comprising a computer readable medium storing a program of instructions for performing distribution of shared content;
a processor that executes the program of instructions;
a shared content request unit to receive a shared content request;
a bid retrieval unit to retrieve a plurality of shared content items based on the shared content request, and to retrieve a plurality of bids corresponding to the plurality of shared content items, respectively;
a probability retrieval unit to retrieve a plurality of likelihood values for each of the plurality of bids, respectively, wherein each of the plurality of likelihood values represents a probability of a subsequent termination of access to a corresponding one of the plurality of shared content items being accessed;
a bid adjustment unit to adjust the plurality of bids based on an effect of the corresponding plurality of shared content items on the corresponding plurality of likelihood values; and
a shared content selection unit to select shared content based on the adjusted plurality of bids.

2. The system according to claim 1, wherein the shared content request is transmitted from a content source.

3. The system according to claim 2, wherein the plurality of likelihood values is populated by machine learning via data observed from the content source.

4. The system according to claim 1, wherein the bid adjustment unit calculates each of the adjusted plurality of bids for a plurality of time intervals.

5. The system according to claim 4, wherein a relationship to calculate each of an adjusted plurality of a total values is defined as:

$$C\text{-}sc*(1+K*P\text{-keepwatch}),$$

where C-sc is a cost value for each of the plurality of bids, K is a value for each of the plurality of time intervals, and P-keepwatch is a value for each of the plurality of likelihood values.

6. The system according to claim 5, wherein an optimal K value is selected based on machine learning associated with a user accessing the content source.

7. The system according to claim 6, based on the optimal K value selected, the shared content selection unit selects the shared content based on a maximization of C-total, defined by:

$$\frac{C\text{-}s}{CTR(1 + K*P\text{-keepwatch})}$$

where C-s is the value for the adjusted bid associated with a second-place shared content item, and
CTR is a click-through rate associated with the shared content.

8. A method, comprising:
receiving, using a processor, a shared content request;
retrieving a plurality of shared content items based on the shared content request;
retrieving a plurality of bids corresponding to the plurality of shared content items, respectively;
retrieving a plurality of likelihood values for each of the plurality of bids, respectively, wherein each of the plurality of likelihood values represents a probability of a subsequent termination of access to a corresponding one of the plurality of shared content items being accessed;
adjusting, using the processor, the plurality of bids based on an effect of the corresponding plurality of shared content items on the corresponding plurality of likelihood values; and
selecting shared content based on the adjusted plurality of bids.

9. The method according to claim 1, wherein the shared content request is transmitted from a content source.

10. The method according to claim 9, wherein the plurality of likelihood values is populated by machine learning via data observed from the content source.

11. The method according to claim 8, wherein the adjustment is performed by calculating each of the adjusted plurality of bids for a plurality of time intervals.

12. The method according to claim 11, wherein a relationship to calculate each of an adjusted plurality of a total values is defined as:

$$C\text{-}sc*(1+K*P\text{-keepwatch}),$$

where C-sc is a cost value for each of the plurality of bids, K is a value for each of the plurality of time intervals, and P-keepwatch is a value for each of the plurality of likelihood values.

13. The method according to claim 12, wherein an optimal K value is selected based on machine learning associated with a user accessing the content source.

14. The method according to claim 13, based on the optimal K value selected, the shared content selected is based on a maximization of C-total, defined by:

$$\frac{C\text{-}s}{CTR(1 + K*P\text{-keepwatch})}$$

where C-s is the value for the adjusted bid associated with a second-place shared content item, and
CTR is a click-through rate associated with the shared content.

15. A non-transitory computer readable storage medium having executable instructions that, when executed by a processor, cause the processor to:
receive, using the processor, a shared content request;
retrieve a plurality of shared content items based on the shared content request;
retrieve a plurality of bids corresponding to the plurality of shared content items, respectively;

retrieve a plurality of likelihood values for each of the plurality of bids, respectively, wherein each of the plurality of likelihood values represents a probability of a subsequent termination of access to a corresponding one of the plurality of shared content items being accessed;

adjust, using the processor, the plurality of bids based on an effect of the corresponding plurality of shared content items on the corresponding plurality of likelihood values; and select shared content based on the adjusted plurality of bids.

* * * * *